United States Patent [19]

Chahroudi et al.

[11] 4,389,452
[45] Jun. 21, 1983

[54] TRANSPARENT INFRARED RADIATION ABSORPTION SYSTEM

[75] Inventors: Day Chahroudi, Placitas, N. Mex.; John R. Brookes, Berkeley, Calif.

[73] Assignee: The Southwall Corporation, Palo Alto, Calif.

[21] Appl. No.: 138,784

[22] Filed: Apr. 9, 1980

Related U.S. Application Data

[63] Continuation-in-part of Ser. No. 870,396, Jan. 18, 1978, abandoned, which is a continuation-in-part of Ser. No. 680,262, Apr. 26, 1976, abandoned, which is a continuation-in-part of Ser. No. 471,767, May 20, 1974, Pat. No. 3,953,110.

[51] Int. Cl.³ .......................... B32B 7/02; B32B 9/04
[52] U.S. Cl. .................................... 428/215; 350/1.1; 428/333; 428/447; 428/913; 428/918
[58] Field of Search ............... 126/450, 901, 449, 451; 428/447, 918, 913, 448, 451, 328, 331, 333, 215; 350/1.1–1.4, 1.6, 1.7, 164, 167

[56] References Cited

U.S. PATENT DOCUMENTS

| 3,341,464 | 9/1967 | Susi et al. | 350/1.1 |
| 3,451,838 | 6/1969 | Burzynski et al. | 428/412 |
| 3,953,110 | 4/1976 | Charoudi | 428/38 |
| 4,008,708 | 2/1977 | Hagarty | 126/901 |
| 4,026,268 | 5/1977 | Bartos et al. | 126/450 |
| 4,082,082 | 4/1978 | Harvey | 126/449 |
| 4,162,343 | 7/1979 | Wilcox et al. | 428/913 |
| 4,224,927 | 9/1980 | Patil | 126/450 |

*Primary Examiner*—William J. Van Balen
*Attorney, Agent, or Firm*—John L. McGannon

[57] ABSTRACT

Apparatus for minimizing the transmission of long wave infrared energy without significantly affecting the transmission of solar energy to provide an energy efficient building component is disclosed. A flexible plastic substrate is used having a thickness of no more than approximately 20 mils. A long wave infrared radiation absorbing material is fixed to the plastic substrate. The substrate and the absorber in combination are at least 94% transmissive to visible solar radiation so that transmission of solar energy is substantially unaffected. However, the substrate and the absorber absorb sufficient long wave infrared radiation so that transmission of at least 80% of all incident long wave radiation is prevented, in large measure blocking the transmission of heat energy through the system.

5 Claims, 7 Drawing Figures

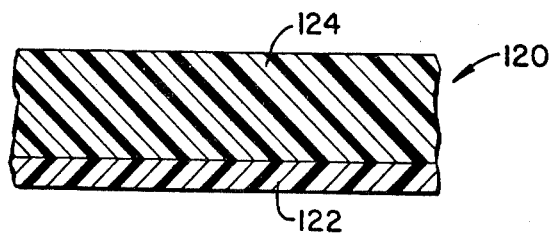
FIG._1.
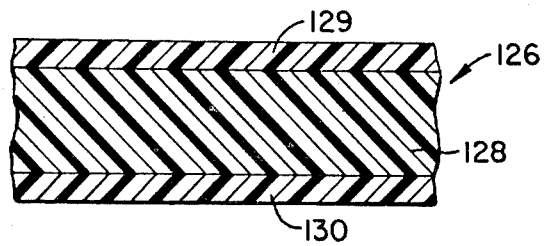
FIG._2.
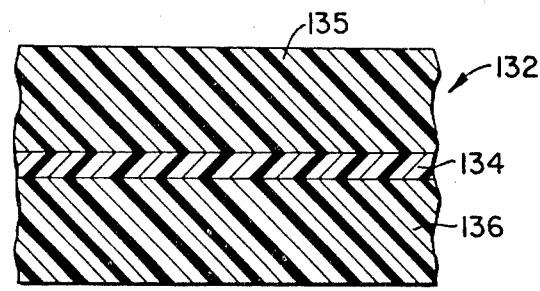
FIG._3.
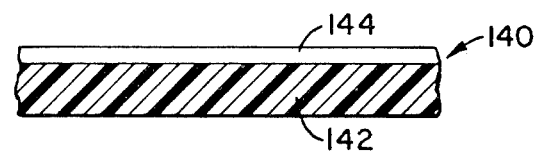
FIG._4.
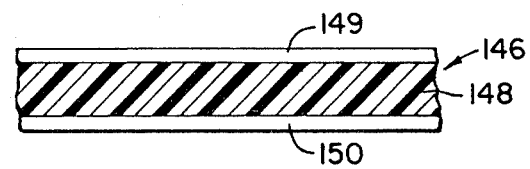
FIG._5.
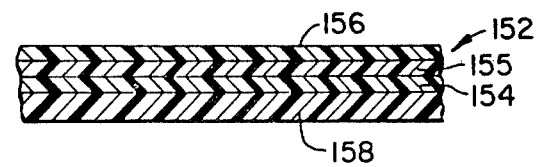
FIG._6.
FIG._7.

TRANSPARENT INFRARED RADIATION ABSORPTION SYSTEM

This application is a continuation in part of our co-pending application of the same title, Ser. No. 870,396, filed Jan. 18, 1978, now abandoned, which was a continuation in part of an application entitled ENERGY CONTROL SYSTEM, Ser. No. 680,262, filed Apr. 26, 1976, now abandoned, which is in turn a continuation in part application of the application of Chahroudi entitled TRANSPARENT THERMAL INSULATING SYSTEM, Ser. No. 471,767, filed May 20, 1974, now issued as U.S. Pat. No. 3,953,110 on Apr. 27, 1976.

BACKGROUND OF THE INVENTION

The present invention relates to transparent long wave infrared absorbing systems, and in particular to such systems employing a flexible plastic substrate.

To efficiently utilize solar energy, it is often desirable to collect solar energy within a spatial volume, and trap the solar energy within said volume. Solar energy is concentrated primarily in wavelengths ranging from 0.4 to 2.5 microns, including the visible spectrum from 0.4 to 0.7 microns and the near infrared spectrum from 0.7 to 2.5 microns. When such solar energy strikes an object, it is generally reradiated as heat energy, which is concentrated in the long wave infrared spectrum from approximately 2.5 to 50 microns. Accordingly, to efficiently trap solar energy within a spatial volume, it is essential to allow radiation within the solar spectrum to pass into the volume, but prevent radiation in the long wave infrared region from escaping therefrom.

A variety of different types of compounds have been developed which are generally transmissive to radiation in the solar spectrum but opaque to radiation in a long wave infrared radiation spectrum. However, all such materials generally require that they be applied to a glass or thick inflexible acrylic substrate. Such compounds now in use typically require high heat or solvents in their application process and cannot be applied to thin, flexible plastic. As a result, such materials are quite expensive, difficult to work with and very difficult to retrofit in existing structures.

SUMMARY OF THE INVENTION

The present invention provides apparatus for minimizing the transmission of long wave infrared energy without significantly affecting the transmission of solar energy to provide an energy efficient building component. A flexible plastic substrate is used having a thickness of no more than approximately 20 mils. A long wave infrared radiation absorbing material is fixed to the plastic substrate. The substrate and the absorber in combination are at least 94% transmissive to visible and other solar radiation so that transmission of solar energy is substantially unaffected. However, the substrate and the absorber absorb sufficient long wave infrared radiation so that transmission of at least 80% of all incident long wave radiation is prevented, in large measure blocking the transmission of heat energy through the system.

The building component of the present invention can be employed in housing construction, solar collectors and the like. It is generally used with additional solar control apparatus, as described in the patent to Chahroudi, U.S. Pat. No. 3,953,110. In such applications, the present invention can be readily installed, and efficiently retrofitted. In addition, the cost of the material is substantially less than materials now in existence requiring glass or heavy plastic substrates.

The novel features which are characteristic of the invention, as to organization and method of operation, together with further objects and advantages thereof will be better understood from the following description considered in connection with the accompanied drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a fragmentary sectional view of a first embodiment of the present invention in which a relatively thick coating is applied on one side of a plastic substrate;

FIG. 2 is a fragmentary sectional view of a second embodiment of the present invention in which an absorbing substance is sandwiched between plastic substrates;

FIG. 3 is a fragmentary sectional view of a third embodiment of the present invention in which an absorbing material is located on both sides of a plastic substrate;

FIG. 4 is a fragmentary sectional view of a fourth embodiment of the present invention in which a thin film absorbing layer is applied to the plastic substrate;

FIG. 5 is a fragmentary sectional view of a fifth embodiment of the present invention in which a long wave infrared absorbing plastic is coated with anti-reflective layers;

FIG. 6 is a fragmentary sectional view of a sixth embodiment of the present invention in which multiple layers of absorbing material are applied to a plastic substrate; and FIG. 7 is a fragmentary sectional view of a seventh embodiment of the present invention in which a bound mixture of infrared absorbing materials is applied to a plastic substrate.

DESCRIPTION OF THE PREFERRED EMBODIMENTS

The figures illustrate various embodiments of long wave infrared absorbing materials. The figures are each greatly enlarged fragmentary cross-sectional view of various types of such material.

Referring initially to FIG. 1, absorbing sheet material 120 includes a plastic substrate 122 having a thickness of at least ½ mil (i.e., 0.0005 inch) but no greater than about 20 mils so that the material is flexible. A long wave infrared absorbing substance 124 consisting of a silicone resin having a thickness of at least 2 mils and preferably 4 mils or more is mounted to substrate 122.

Long wave infrared absorbing substance 124 is a poly(dialkyl siloxane) or a copolymer containing large proportions thereof. Poly(dialkyl siloxane) is a silicone resin which comes in various polymeric forms, generally all of which are efficient absorbers of long wave infrared radiation. For example, one such form includes a benzene ring in place of one of the alkyl radicals. Poly(dialkyl siloxane) has a low index of refraction and is highly transmissive to visible radiation.

Plastic substrate 122 may be constructed of a long wave infrared absorbing plastic to enhance and supplement the absorbing characteristics of substance 124. However, plastic substrate 122 may also be long wave infrared transparent, in which case the absorbing characteristics of material 120 will be symmetric. Substrate 122 should have good strength characteristics, in particular a high tear strength, and should be relatively insusceptible to aging effects (sunlight, ozone, fungus, flexing, etc.). Substrate 122 should also have a low index of refraction which typically indicates that it is highly transparent to visible light. Materials sold by DuPont under the trademarks "TEDLAR", "TEFZEL" and "FEP" have been found to be acceptable for this purpose.

A poly(dialkyl siloxane) layer 124 at least 2 mil thick has been found to absorb sufficient long wave infrared radiation so as to prevent the transmission of at least 80% of all of the long wave infrared radiation incident on material 120. However, material 120 is highly transmissive to visible radiation, more than 94% of all incident radiation being transmitted. Material 120 can be used in addition to standard glass window members in multilayered systems if the layers 122, 124 are transparent, without significantly degrading the optical properties thereof while still providing substantial thermal insulation. In other applications, optical imaging is not useful, and transparency is not needed.

FIG. 2 provides a long wave infrared absorbing sheet material 126 which is a modified form of that illustrated in FIG. 1. Material 126 includes a silicone resin 128 of poly(dialkyl siloxane) at least 2 mil thick sandwiched between flexible substrate layers 129, 130 having a thickness from about 0.5 to 20 mils. In this embodiment, again, substrate layers 129, 130 may be constructed of long wave infrared absorbing material to enhance the absorption function of substance 128. Layers 129, 130 should have low indices of refraction to enhance solar transmission.

Referring to FIG. 3, a long wave infrared absorbing sheet material 132 is illustrated which is again a modification of that illustrated in FIG. 1. In material 132, flexible plastic substrate 134 is sandwiched between layers 135, 136 of poly(dialkyl siloxane) which are at least 2 mil thick. Absorbing material 132 has certain advantages over those previously illustrated in that substrate 134 is protected, and a greater variety of different types of plastic materials can be used.

In each of the long wave infrared absorbing sheet materials 120, 126, 132 illustrated in FIGS. 1–3, the poly(dialkyl siloxane) resins can include long wave infrared absorbing materials to improve and enhance their absorbing characteristics. In fact, when such materials are used, polymeric binders which are less efficient absorbers of long wave infrared, such as Viton or Polymethyl Methacrylate, could also be used instead of a poly(dialkyl siloxane) resin. These additives can be of three types: polymers, inorganic articles, or organic molecules.

One type of additive could be polymethyl methacryolate (pmma). Pmma can be chopped into small particles and physically mixed, or molecularly integrated with the binder. Also, Viton, manufactured by DuPont, could be physically mixed with the binder. Examples of infrared absorbing inorganic particles are silicon dioxide, aluminum oxide, and silicate glasses. Typical organic molecules are ultraviolet absorbers, such as methoxy-benzophenon derivatives, which are physically attached to the polymeric binder. The use of an ultraviolet absorbing material has the added advantage that increased weathering resistance is obtained.

Referring next to FIG. 4, long wave infrared absorbing sheet material 140 again includes a flexible plastic substrate 142 having a thickness of approximately 0.5 to 20 mils. Plastic substrate 142 should have high strength, good aging properties and be highly transmissive to solar energy. Substrate 142 is coated with a substance 144, the coating having a thickness of between 0.01 and 50 microns. Substance 144 can consist typically of silicon monoxide, or of a selected mix of titanium dioxide and a silicon oxide, or other related materials so as to be absorbing in the long wave infrared spectrum.

In FIG. 5, still another long wave infrared absorbing sheet material 146 is illustrated. Material 146 includes a layer 148 constructed of a flexible plastic which absorbs long wave infrared radiation. Thin films 149, 150 are coated on opposite sides of plastic layer 148. The thickness of plastic layer 148 is between approximately 0.5 and 20 mils. Each thin film 149, 150 provides an anti-reflection coating, such as magnesium fluoride, for visible radiation. The anti-reflection coatings 149, 150 can be of the type which is preferably tuned to the average wave length of sunlight, in which case they would have a thickness of approximately 0.1 micron (a ¼ wavelength).

If other types of anti-reflection coatings are used, the thickness of the coating may vary. Specifically, an efficient anti-reflection coating can be made from a low index material such as PTFE applied in such a thickness that the phase interference of the reflected light is lost. (5–60 microns). At these thicknesses, the low index layer provides a uniform anti-reflection matching over the entire solar spectrum 0.36–2.5 microns, whereas a tuned ¼ wave length layer gets out of tune away from its design wave length. For example, layers 149, 150 can comprise 15 micron thick layers of evaporated PTFE on pmma sheet 148 resulting in decreased reflection losses from 8.5% to 5.4% over the entire solar spectrum. Thermally evaporated 1000 A thin films of $MgF_2$ on each face of the sheet only decrease losses to 6.2%, these losses being integrated over the solar energy spectrum.

Thin films 149, 150 render sheet material 146 highly transparent to visible radiation. Accordingly, the passage of solar radiation through material 146 is substantially increased. However, most of the long wave infrared radiation is absorbed by plastic layer 148 to inhibit the transfer of heat energy through sheet material 146 by infrared radiation.

The infrared absorption may be enhanced by using layers or mixtures of different polymers or inorganic coatings discussed above. The transmission of a given layer is a decreasing exponential function of the thickness of the layer. Typically, a thin (0.001–2 mils) layer will exert most of its infrared absorption in certain wavelength bands characteristic of the material. Increasing the thickness further beyond a certain thickness yields diminishing returns on overall infrared absorption.

FIG. 6 depicts an embodiment 152 of this invention in which multiple thin layers 154–6 of dissimilar long wave infrared absorbing materials are used on flexible plastic substrate 158 to achieve infrared absorption not obtainable except with thicker coatings of a single material. For example, a 3 mil. coating of a poly(dialkyl siloxane) resin Dow Corning 281 on 1 mil DuPont FEP will absorb 92% of the infrared energy as measured on an Eppley integrating thermopile detector. However, a multiple layer coating of 0.5 mil poly(dialkyl siloxane)

(154), 0.5 mil. polymethyl methacrylate (155) and 0.5 mil. "Viton" (DuPont) polymer (156) on 1 mil FEP (158) will absorb 94% of the infrared energy, even though the total thickness of the coating is half that of the single coating. The various substrating arrangements of FIGS. 1-3 can be used in the embodiment of FIG. 6. Also, thin film absorbing substances such as illustrated in FIG. 4 as well as thicker resin coatings could be used. This invention is important not only in lowering materials costs, but also decreasing production costs.

As an alternative to the multilayer system illustrated in FIG. 6, a single layer system having different constituents can be used, as illustrated in FIG. 7. Again, a flexible plastic substrate 160 is employed. Applied to substrate 160 is a substance 162 absorbent to long wave infrared radiation. Substance 162 includes a binder which may constitute in itself an absorbent material, such as the poly(dislkyl siloxane) silicone resin discussed with reference to FIGS. 1-3. However, other types of polymeric binders that are less efficient in absorbing long wave infrared radiation such as Viton or pmma could be used as well. Long wave infrared absorbing materials are added to the binder, and can constitute the various polymers, inorganic particles or organic molecules discussed with reference to FIG. 1. In the embodiment of FIG. 7, such additives (and the binder itself) comprise combinations of different such substances which are most efficient in absorbing long wave infrared radiation in different portions of the long wave infrared spectrum. As a result, the various additives and the binder exert a synergistic absorption effect throughout the long wave infrared radiation region.

While a variety of types of materials have been disclosed hereinabove, all such materials include a thin, flexible plastic substrate in combination with a long wave infrared absorbing material adhering thereto, or, in the case of the embodiment of FIG. 5, constituting the plastic material itself. Except for the embodiment of FIG. 5, the plastic substrate may or may not be an absorbent material in and of itself.

All of the materials depicted above exhibit high transmission of solar energy, at least 94%, while absorbing sufficient long wave infrared radiation to prevent transmission of at least 80% of such radiation therethrough. Such materials provide efficient absorbance of long wave infrared radiation without the necessity of heavy, rigid substrates such as glass and thick acrylic as was the case previously.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. Apparatus for minimizing the transmission of long wave infrared energy without significantly affecting the transmission of solar energy to provide an energy efficient building component, such apparatus comprising:
    a flexible plastic substrate of sheet material having a thickness of no more than approximately 20 mils; and
    sheet means secured to said substrate for absorbing longwave infrared radiation, said absorbing means including an oxide coating absorptive to long wave infrared radiation and having a thickness of between 0.01 and 50 microns, the sheet material of said substrate with said sheet means having adjacent faces in engagement with each other throughout substantially the entire surface areas of said faces;
    said substrate and said absorbing means in combination being at least 94% transmissive to visible and other solar radiation while absorbing sufficient long wave infrared radiation to prevent the transmission of at least 80% of all incident long wave infrared radiation.

2. Apparatus for providing transparent thermal insulation comprising an infrared absorbing sheet which includes:
    a flexible plastic substrate having a thickness of no more than approximately 20 mils and comprising visibly transmissive sheet material having a low index of refraction to allow for relatively unobstructed passage of visible radiation therethrough; and
    a layer of inorganic compound material having a thickness of approximately 0.5 to 50 microns, said layer and the sheet material of said substrate having respective adjacent faces, said faces being in engagement with each other throughout substantially the entire surface areas of the faces, said inorganic compound material adapted to absorb long wave infrared radiation.

3. Apparatus as recited in claim 2 wherein said substrate comprises a long wave infrared absorbing material.

4. Apparatus as recited in claim 2 wherein said inorganic compound material comprises silicon monoxide.

5. Apparatus as recited in claim 2 wherein said inorganic compound material comprises a selected mixture of titanium dioxide and a silicon oxide adapted to absorb long wave infrared radiation.

* * * * *